(12) United States Patent
Moore et al.

(10) Patent No.: US 9,088,674 B2
(45) Date of Patent: Jul. 21, 2015

(54) ENHANCED JOB CONFIRMATION SHEET

(71) Applicant: XEROX Corporation, Norwalk, CT (US)

(72) Inventors: John A. Moore, Victor, NY (US); Donald M. Pangrazio, III, LeRoy, NY (US)

(73) Assignee: Xerox Corporation, Norwalk, CT (US)

( * ) Notice: Subject to any disclaimer, the term of this patent is extended or adjusted under 35 U.S.C. 154(b) by 55 days.

(21) Appl. No.: 13/861,466

(22) Filed: Apr. 12, 2013

(65) Prior Publication Data

US 2014/0307285 A1 Oct. 16, 2014

(51) Int. Cl.
G06K 15/00 (2006.01)
H04N 1/00 (2006.01)
H04N 1/32 (2006.01)
G06K 15/02 (2006.01)

(52) U.S. Cl.
CPC ....... *H04N 1/00236* (2013.01); *H04N 1/00132* (2013.01); *H04N 1/00477* (2013.01); *H04N 1/00485* (2013.01); *H04N 1/00506* (2013.01); *H04N 1/32112* (2013.01); *G06K 15/00* (2013.01); *G06K 15/02* (2013.01); *H04N 1/00167* (2013.01); *H04N 1/00968* (2013.01); *H04N 2201/325* (2013.01); *H04N 2201/3205* (2013.01); *H04N 2201/3216* (2013.01); *H04N 2201/3219* (2013.01); *H04N 2201/3221* (2013.01); *H04N 2201/3222* (2013.01); *H04N 2201/3269* (2013.01); *H04N 2201/3271* (2013.01)

(58) Field of Classification Search
None
See application file for complete search history.

(56) References Cited

U.S. PATENT DOCUMENTS

| | | |
|---|---|---|
| 5,377,017 A | 12/1994 | Lam |
| 5,513,017 A | 4/1996 | Knodt et al. |
| 6,032,004 A | 2/2000 | Mirabella, Jr. et al. |
| 6,208,436 B1 | 3/2001 | Cunningham |
| 6,643,028 B1* | 11/2003 | Ogaki et al. ............... 358/1.6 |
| 6,873,429 B2 | 3/2005 | Matsuura |
| 7,383,494 B2 | 6/2008 | Krolczyk et al. |
| 7,561,296 B2* | 7/2009 | Fujinaga .................. 358/1.18 |
| 7,804,979 B2 | 9/2010 | Spitzig et al. |
| 7,812,995 B2 | 10/2010 | Braswell et al. |
| 2001/0052992 A1* | 12/2001 | Tatsumi ..................... 358/1.9 |
| 2002/0051201 A1* | 5/2002 | Winter et al. ............. 358/1.16 |
| 2003/0048484 A1* | 3/2003 | Seki et al. .................. 358/402 |
| 2005/0198558 A1* | 9/2005 | Chrisop et al. ............ 715/500 |
| 2005/0200923 A1* | 9/2005 | Shimada et al. ........... 358/537 |
| 2010/0064011 A1* | 3/2010 | Shahine ..................... 709/206 |

\* cited by examiner

*Primary Examiner* — Miya J Cato
(74) *Attorney, Agent, or Firm* — Gibb & Riley, LLC

(57) ABSTRACT

Methods and systems receive a scan job into a computerized device from an optical scanning device. The computerized device is operatively connected to the optical scanning device. These methods and systems process, using the computerized device, the scan job. Further, such methods and systems use the computerized device to cause a printing device operatively connected to the optical scanning device to print a scan confirmation sheet. The scan confirmation sheet indicates that the computerized device received the scan job. The scan confirmation sheet comprises computer readable markings. The computerized device can receive a transmission of the computer readable markings from a second device separate from the computerized device. In response to receiving the transmission of the computer readable markings printed on the scan confirmation sheet, the computerized device can provide the status of the processing of the scan job, and/or alter or cancel the processing of the scan job.

24 Claims, 4 Drawing Sheets

ENHANCED JOB CONFIRMATION SHEET

BACKGROUND

Systems and methods herein generally relate to scan workflow systems, and to systems that produce a confirmation sheet that a scan has been received.

In a typical distributed scan environment, where a user submits a scanned document to a particular business process, the end user often gets little to no feedback on the status of the job submitted. Take, for instance, a user faxing a form into a processing center. Sometimes the only confirmation provided is a message that a fax was sent. But if the user loaded sheets in the document handler upside down, and blank pages got faxed over, the user might not be notified of this, or might be notified much later. In a networked distributed scan system, the user can sometimes get a confirmation that a certain number of non-blank pages were received, but little to no confirmation of the quality or other characteristics (color versus black and white) is provided to the user. This often leaves the user unsure of that status of their job, and this requires the user to perform extra steps, if needed (such as a call to a help desk, or the user having to go to a portal, etc.).

SUMMARY

Exemplary methods herein receive a scan job into a computerized device from an optical scanning device. The computerized device is operatively (meaning directly or indirectly) connected to the optical scanning device. These methods process the scan job using the computerized device. Further, such methods use the computerized device to cause a printing device (operatively connected to the optical scanning device) to print a scan confirmation sheet. The scan confirmation sheet indicates that the computerized device received the scan job. The scan confirmation sheet also comprises computer readable markings, and can include human readable markings, images of at least some of the pages in the scan job, the status of the processing, etc.

The computerized device can receive a transmission of the computer readable markings from the confirmation sheet from a second device separate from the computerized device. The scan confirmation sheet can also include checkboxes containing locations for users to supply markings. More specifically, the scan confirmation sheet can include printed user processing options adjacent the checkboxes. Thus, when the scan confirmation sheet is transmitted to the computerized device, the user-supplied markings within the checkboxes cause the computerized device to perform the checkbox selected workflow options on the scan job.

Thus, in response to receiving the transmission of the computer readable markings from the confirmation sheet, the computerized device can provide the status of the processing of the scan job to the device that sent the transmission, and/or alter or cancel the processing of the scan job. When altering the processing the computerized device can cancel the processing of the scan job, can submit a different scan job in place of the original scan job, can change processing operations to be performed on the scan job, etc. When providing the status of the scan job, the computerized device can identify the pending and completed portions of the workflow operations of the scan job.

Other exemplary methods herein receive a first scan job into the computerized device from the optical scanning device and process the first scan job using the computerized device. The computerized device again causes the printing device to print a scan confirmation sheet; however, here the scan confirmation sheet can indicate an error associated with the first scan job (e.g., sheet loading error, scan quality error, sheet order/orientation error, transmission error, etc.). Again, the scan confirmation sheet includes the computer readable markings.

Subsequently, the computerized device receives a second scan job where the confirmation sheet printed for the first scan job is used as a coversheet (or is the only sheet in the second scan job). In response to receiving the second scan job, these methods can alter the processing of the first scan job by, for example, processing at least one additional scanned sheet that may accompany or follow the confirmation sheet (if the confirmation sheet is used as a cover sheet for the second scan job) to alter the processing of the first scan job.

Exemplary apparatuses or devices herein (which can be special purpose devices) can include (among other components) a processor device and an input/output device operatively connected to the processor device. The computerized device can be operatively connected to an optical scanning device and a printing device. The input/output device receives a scan job from the optical scanning device and the processor device processes the scan job.

The processor device creates a scan confirmation sheet indicating that the computerized device received the scan job. The scan confirmation sheet again includes computer readable markings. The input/output device transmits the scan confirmation sheet to the printing device, and the computerized device causes the printing device to print the scan confirmation sheet. The input/output device can then receive a transmission of the computer readable markings from a second device separate from the computerized device. In response to the input/output device receiving the transmission of the computer readable markings from the confirmation sheet, the input/output device can provide the status of the processing, and the processor device can alter the processing of the scan job, etc.

Additional apparatuses or devices herein similarly can include (among other components) a processor device and an input/output device operatively connected to the processor device. The computerized device again can be operatively connected to an optical scanning device and a printing device. Here, the input/output device receives a first scan job from the optical scanning device, and the processor device processes the first scan job. The processor device again creates a scan confirmation sheet indicating that the computerized device received the first scan job. The scan confirmation sheet again comprises computer readable markings. The input/output device also transmits the scan confirmation sheet to the printing device, and the computerized device causes the printing device to print the scan confirmation sheet.

Here, the input/output device receives a second scan job with the confirmation sheet as a coversheet (or the only sheet). In response to the input/output device receiving the second scan job, the processor alters the processing of the first scan job, or the processor can process any additional scanned sheet(s) accompanying the confirmation sheet coversheet within the second scan job to alter the processing of the first scan job.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
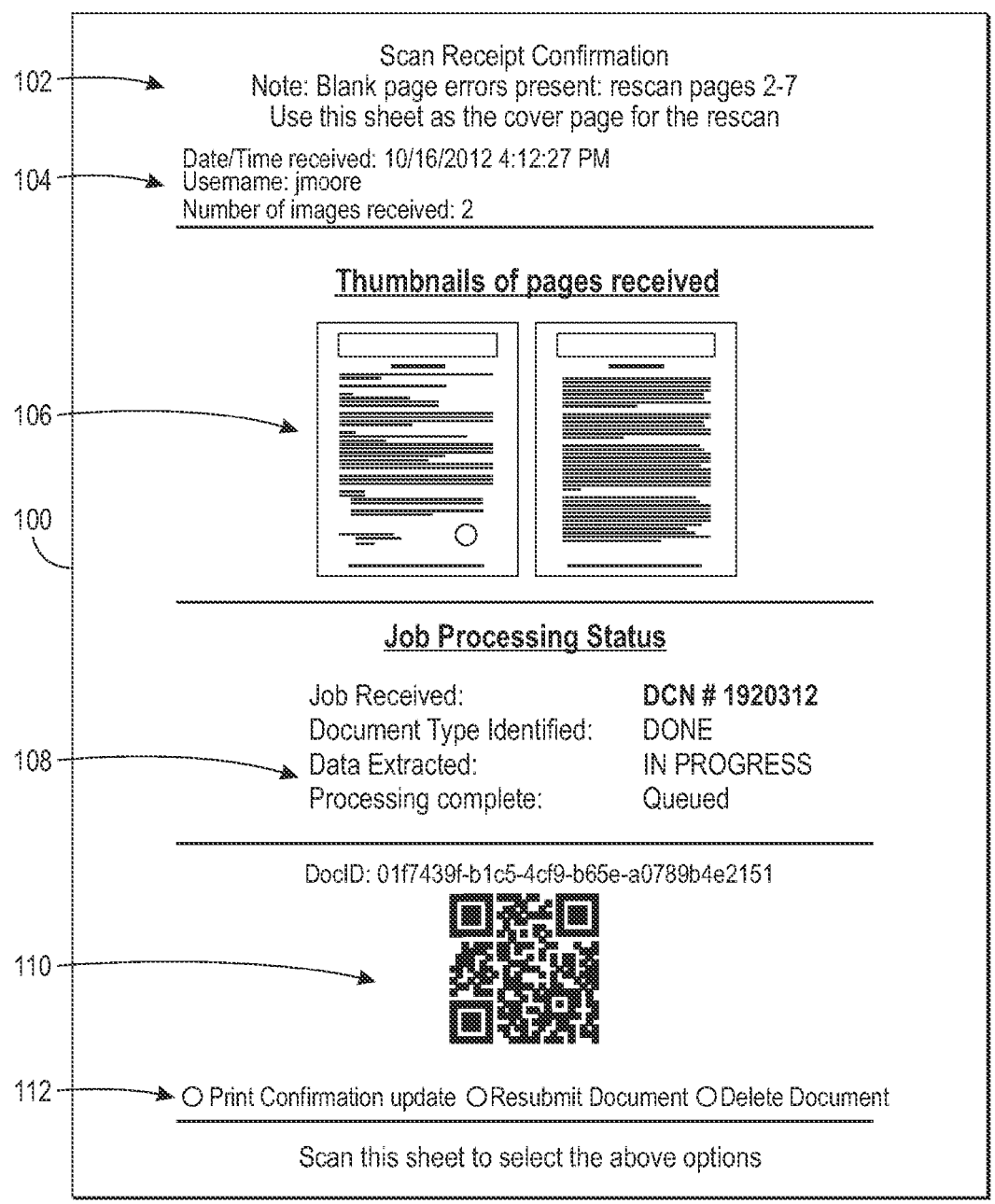
FIG. 1 is a schematic diagram illustrating devices herein.

As mentioned above, conventional systems can provide little or no feedback to the user regarding how successful a scanned document was processed through the entire scan workflow system. Therefore, the systems and methods herein print enhanced job confirmation print reports that can be used subsequently as coversheets for job resubmission or other actions. FIG. 1 illustrates an exemplary scan receipt confirmation 100 that is produced according to methods and systems herein.

More specifically, FIG. 1 illustrates that the scan receipt confirmation 100 can provide error messages 102 to the user, can identify the details of this can 104 (date, time, user name, number of pages received, etc.), can provide thumbnails of some or all of the pages received 106, can provide a job processing status 108 showing various processing steps that have been completed and that are yet to be completed, provides a computer readable marking 110 (barcode, glyph, quick reference (QR) code, etc.), and can provide user menu options and checkboxes 112 as a way for the user to select available options when communicating back with the scan processing system by scanning the scan receipt confirmation 100.

The computer readable marking 110 (shown in FIG. 1 as a QR code, but could utilize any symbology) allows the scan processing system to associate future requests back to the original scan job. Note that the scan receipt confirmation sheet 100 represents more than just a scan confirmation, as it can include the status of the business process to which it is associated 108. The methods and systems herein allow for configurable levels of confirmation, where the desired information and steps can be determined uniquely for each business process it is associated to.

In one example, a user receives the printed job confirmation 100 after initiating a distributed scan job to a business processing system. The job confirmation sheet includes configurable components, such as those shown in FIG. 1, which allows the user to use the confirmation sheet as a coversheet in subsequent system interactions. Examples of the enhanced components that the confirmation sheet 100 can present include the basic submitter information 104, such as username, device, date, and time; basic scan information 104 such as the number of pages received, type of image received; advanced scan information such as thumbnails 106 and the number of blank pages removed; the job processing status 108 (providing step-by-step status of the associated workflow steps); the scan job identification information 110 including a human readable reference number and machine readable reference number; job "actions" controls 112 allowing the user to indicate desired processing steps to be applied when the scan confirmation sheet is used as a coversheet in subsequent submission(s). As would be understood by those ordinarily skilled in the art, the scan confirmation sheet can be used to confirm multiple (a batch) of jobs, rather than just a single job.

The systems and methods herein support the ability to use an alternative input device such as a digital camera, smart phone, or barcode scanner to identify the bar code on the confirmation sheet and get updated job status, and/or trigger related actions (such as delete or cancel). With systems and methods herein, the end user is provided with a sense they still have "ownership' or control over the process, as opposed to standard faxing of a document, where the user immediately loses touch with the submitted job. Also, the printed confirmation frees up the scanner's user interface for programming the next scan job.

FIG. 1 illustrates one example of a scanned receipt confirmation; however, as would be understood by those ordinarily skilled in the art, the scan receipt confirmation could take many forms. Further, the information included within the scan receipt confirmation will vary depending upon whether scan errors are present and upon the complexity of the workflow processing that the scanned images will undergo.

Thus, in one example, if there are no errors, the error message 102 will not be printed. Further, the options presented to the user in the check box in region 112 can be increased or decreased depending upon workflow options that are available (considering the complexity of the workflow that will be applied to the scan images). For example, if the scan did include error pages, the user could be provided a checkbox option to simply ignore such errors. This could be especially useful for very large scans where the error pages were relatively insignificant, or where the user desires to avoid slowing the scan workflow and only wants the correctly scanned pages to be processed.

Figure 2:
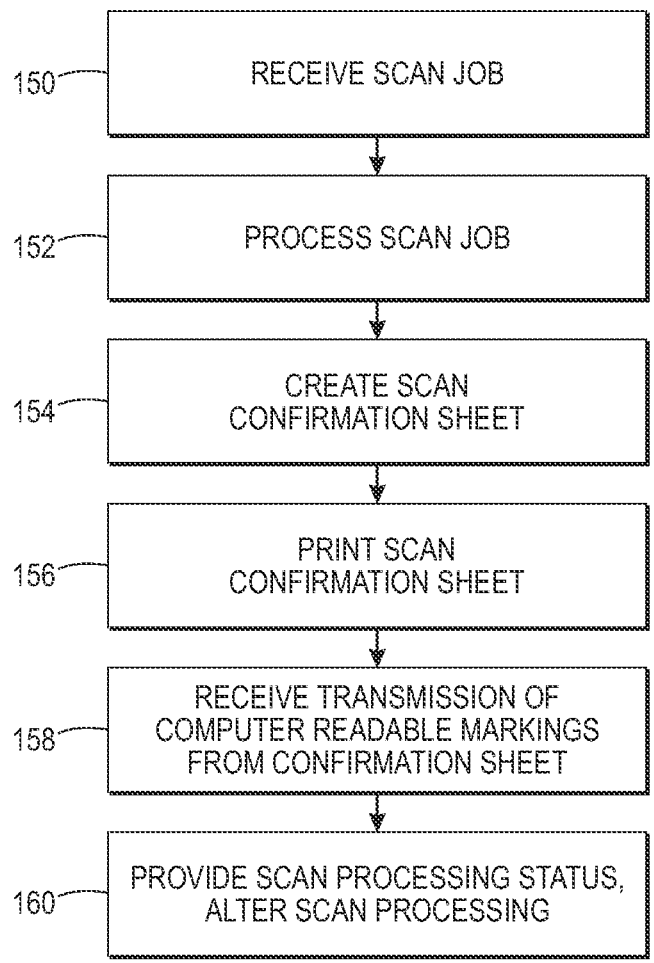
FIG. 2 is a flow diagram of various methods herein.

FIG. 2 is flowchart illustrating exemplary methods herein. A scan workflow user commonly place items such as printed sheets of paper (or other physical items) in the sheet feeder or scanning area of an optical scanner to begin a scan workflow. The electronic images created by the scanning operation can be sent to a computerized device for storage, transmission, or processing within, for example, a records management system. Therefore, the flowchart in FIG. 1 shows, in item 150, that the methods herein receive a scan job into a computerized device from an optical scanning device. As shown in greater detail below, the computerized device is operatively (meaning directly or indirectly) connected to the optical scanning device.

In item 152, these methods process the scan job according to the scan workflow requirements using the computerized device. Again, the workflow processing performed on the scanned images can take any form including optical character recognition (OCR), image storage, record keeping management, data input, forwarding (through e-mail, instant messaging, web posting, etc.), etc.

Further, as shown in item 154, such methods use the computerized device to create an electronic version of a scan confirmation sheet that indicates to the user performing the scan that the computerized device has at least received the scan job. The scan confirmation sheet produced by methods and systems herein comprises computer readable markings, and can also include human readable markings, images of at least some of the pages in the scan job, the status of the processing, etc. In item 156, the methods use the computerized device to cause a printing device (that is operatively connected to the optical scanning device) to print the scan confirmation sheet out (place marking on a sheet of media, such as paper) for the user performing the scan.

This completes the initial scan processing; however, the user may desire to follow up on the original scan to check its workflow status, to see if any re-scanning is required, etc. Because the scan confirmation street includes computer readable markings, the user can acquire an electronic form of an image of the computer readable markings (e.g., by scanning the confirmation sheet, by taking a picture of the confirmation sheet using a camera enabled device, such as a tablet, smart phone, PDA, etc.) and send the image of the computer readable markings to the computerized device. Therefore, in item 158, the computerized device can receive a transmission (e.g., scanned image, picture, etc.) of the computer readable markings on the confirmation sheet from the original scanning device or a second device, both of which are separate from the computerized device.

As shown in FIG. 1, the scan confirmation sheet can also include checkboxes containing locations for users to supply markings. More specifically, as shown in FIG. 1, the scan confirmation sheet can include printed user processing options adjacent the checkboxes. Thus, when the scan confirmation sheet is transmitted to the computerized device in item 158, the user-supplied markings within the checkboxes cause the computerized device to perform the checkbox selected workflow processing options on the scan job.

While only three simplistic workflow options are shown in the example presented in FIG. 1, those ordinarily skilled in the art would understand that a multitude of options (which can be very complex) could be provided to the user, especially if the scanned images were subjected to complex processing. Further, if desired by the administrator, users may not be provided any options, but instead made just be provided with instructions (such as the instructions to rescan appearing in item 102).

Thus, in response to receiving the transmission of the computer readable markings from the confirmation sheet in item 158, the computerized device can provide the status of the processing of the scan job to the device that sent the transmission, and/or alter or cancel the processing of the scan job, as shown in item 160. When altering the processing, the computerized device can cancel the processing of the scan job, can submit a different scan job in place of the original scan job, can change processing operations to be performed on the scan job, etc. When providing the status of the scan job, the computerized device can identify the pending and completed portions of the workflow processing operations of the scan job.

Other exemplary methods can indicate an error associated with the first scan job (e.g., sheet loading error, scan quality error, sheet order/orientation error, transmission error, etc.) on the scan confirmation sheet in addition to the computer readable markings. For example, some of the scanned images may be blank (potentially indicating that they were placed upside down in the optical scanner), the scan quality may be below acceptable standards, etc. In this example, therefore, the scan confirmation sheet includes a printed message requesting the user to provide additional instructions regarding this scanning error (cancel the scan, cancel the erroneous portion of the scan, rescan the entire scan job (or portions of the scan job), omit certain processing (omit OCR processing) etc.). In response, the user provides instructions to the computerized device using the scan confirmation sheet by either following the instructions on the scan confirmation sheet (rescanning the entire job, the scanning the indicated portion of the job, etc.) or by making markings within the check boxes to make selection among the various user options provided on the scan confirmation sheet.

In any case, in response to the error comments or error instructions contained within the scan confirmation sheet, the user provides (and the computerized device receives) a second scan job (from the original scanner or a different scanning device) and this is represented by item 158 in the flowchart shown in FIG. 2. In the second scan job, the confirmation sheet printed for the first scan job is used as a coversheet (or is the only sheet in the second scan job). In response to the receiving the second scan job (as shown in item 160 in FIG. 2) these methods can alter the processing of the first scan job by, for example, processing at least one additional scanned sheet that may accompany the confirmation sheet (within the second scan job) to alter the processing of the first scan job.

Figure 3:
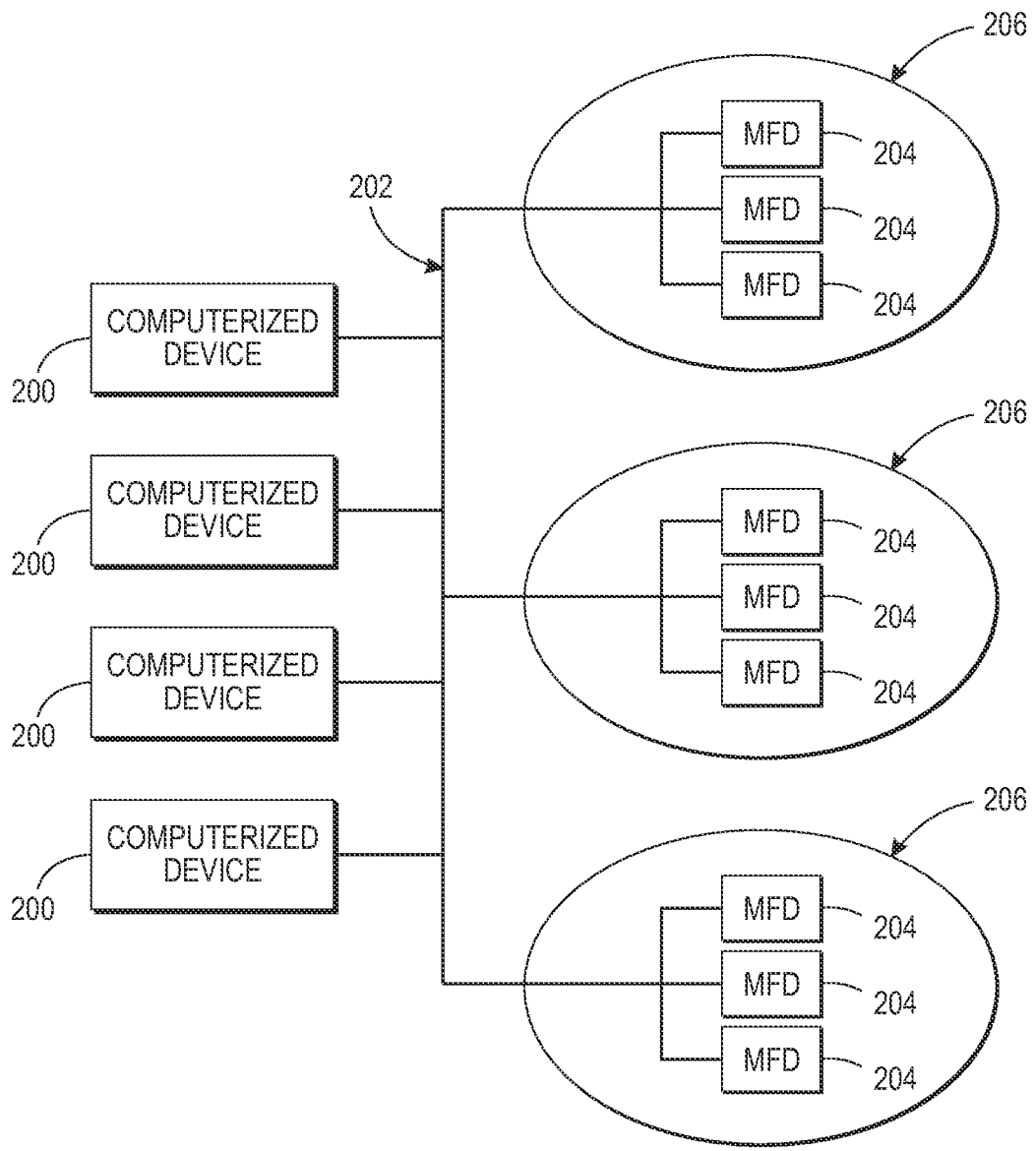
FIG. 3 is a schematic diagram illustrating systems herein.

As shown in FIG. 3, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 4:
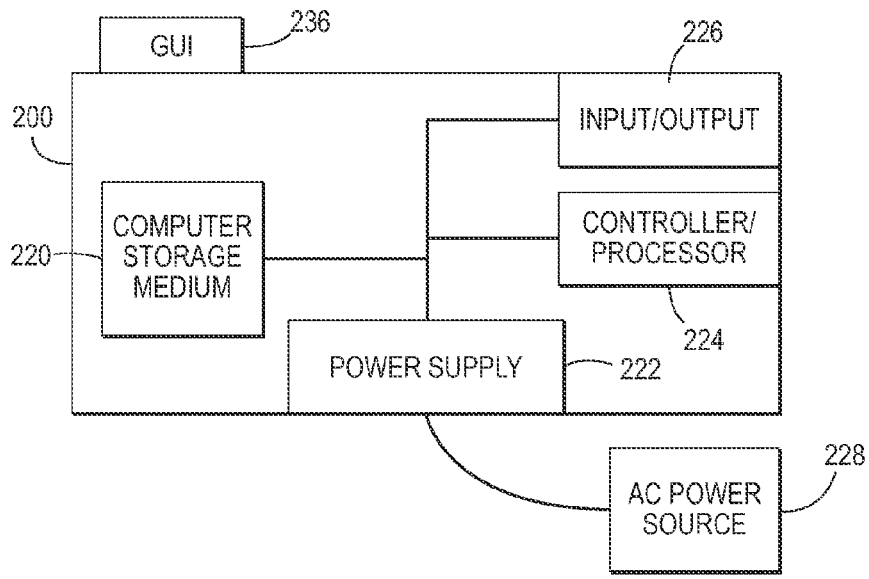
FIG. 4 is a schematic diagram illustrating devices herein.

FIG. 4 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory tangible computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 4, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 5:
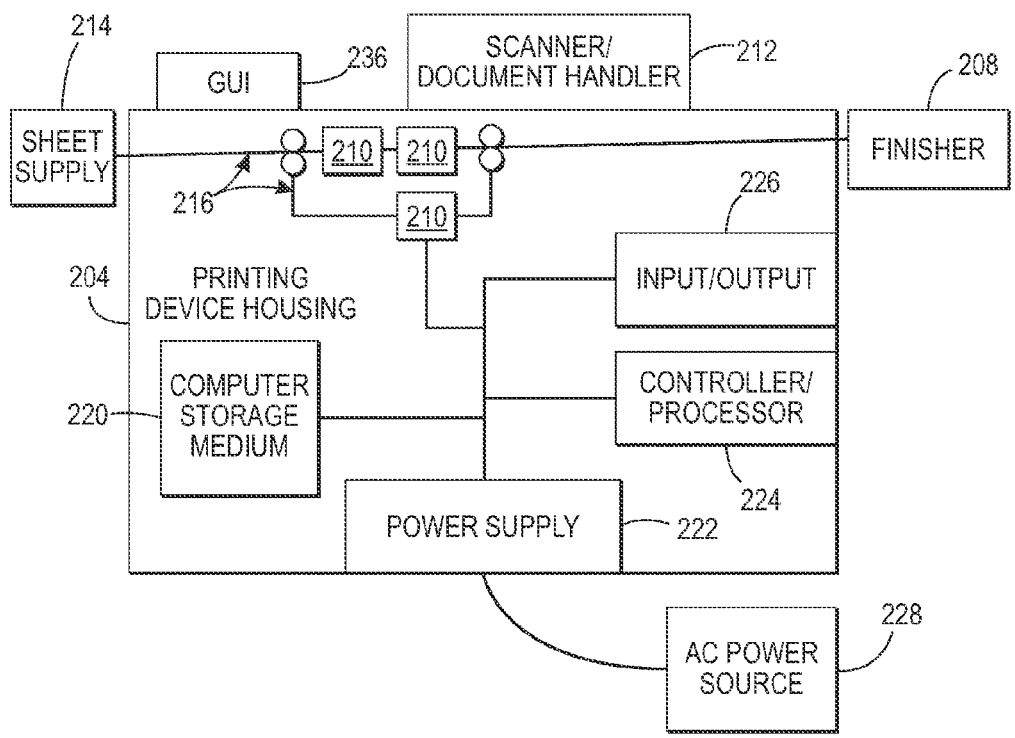
FIG. 5 is a schematic diagram illustrating devices herein.

FIG. 5 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Thus, exemplary apparatuses or devices herein (which can be special purpose devices) can include (among other components) a processor device 224 and an input/output device 226 operatively connected to the processor device 224. The computerized device 200 can be operatively connected to an optical scanning device 212 and a printing device 204. The input/output device 226 receives a scan job from the optical scanning device 212, and the processor device 224 processes the scan job.

The processor device 224 creates a scan confirmation sheet indicating that the computerized device received the scan job. The scan confirmation sheet again includes computer readable markings. The input/output device 226 transmits the scan confirmation sheet to the printing device 204, and the computerized device causes the printing device 204 to print the scan confirmation sheet. The input/output device 226 can then receive a transmission of the computer readable markings from a second device 204 separate from the computerized device 200. In response to the input/output device 226 receiving the transmission of the computer readable markings from the confirmation sheet, the input/output device 226 can provide the status of the processing, and the processor device 224 can alter the processing of the scan job, etc.

Additional apparatuses or devices herein similarly can include (among other components) a processor device 224 and an input/output device 226 operatively connected to the processor device 224. The computerized device again can be operatively connected to an optical scanning device 212 and a printing device 204. Here, the input/output device 226 receives a first scan job from the optical scanning device 212, and the processor device 224 processes the first scan job. The processor device 224 again creates a scan confirmation sheet indicating that the computerized device 200 received the first scan job. The scan confirmation sheet again comprises computer readable markings. The input/output device 226 also transmits the scan confirmation sheet to the printing device 204, and the computerized device 200 causes the printing device 204 to print the scan confirmation sheet.

Here, the input/output device 226 receives a second scan job with the confirmation sheet as a coversheet (or the only sheet). In response to the input/output device 226 receiving the second scan job, the processor 224 alters the processing of the first scan job, or the processor 224 can process any additional scanned sheet(s) accompanying the confirmation sheet coversheet within the second scan job to alter the processing of the first scan job.

Therefore, as shown above, the systems and methods herein print out for the user a scan confirmation sheet that can be scanned back in to allow the user to easily correct any scan errors, or to retrieve a processing update for the scan workflow. The systems and methods herein allow the scan receipt confirmation sheet to be configured in a number of different ways (and to include more or less information as necessitated by the scan workflow system) one of which is shown in FIG. 1. Further, more information (or less information) can be automatically added to or removed from the scan receipt confirmation sheet depending upon whether any errors are present, and upon the complexity of workflow that will be performed on the electronic scan document.

The systems and methods herein, by producing a scan confirmation receipt with machine readable markings, allow the user to correct errors, supplement scan information, change scan processing, and inquire about the status of the scan processing at any point that is convenient for the user. For example, a user can scan documents in the morning and simply take their scan confirmation receipt(s). Later in the day (and potentially at a different location), the user can correct any scan errors and check the status of the scan workflow simply by rescanning the scan confirmation receipt sheet, or even potentially by taking a picture of the computer readable code printed on the scan confirmation receipt, and submit the picture through the users smart phone (or other portable electronic device) to obtain a status update of the scan processing.

This avoids requiring the user to perform the sometimes complex task of locating their previous scan within the workflow system, and allows the user the freedom to walk away from the scanner (or begin a different scan job) as soon as the physical scanning process is completed (and the scan confirmation receipt has printed) knowing that they can easily check for errors or other issues that may arise in the scan workflow simply by rescanning the scanned confirmation receipt sheet later. This increases user productivity by allowing the user to immediately engage in different activities, and to easily check upon the scan workflow at some later time. Thus, the systems and methods herein are highly useful and advantageous for the user.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:
1. A method comprising:
  receiving, by a computerized device, a scan job from an optical scanning device, said scan job comprising workflow steps, said computerized device being operatively connected to said optical scanning device;
  processing, by said computerized device, said workflow steps of said scan job;

while portions of said workflow steps of said processing are pending, causing, by said computerized device, a printing device operatively connected to said optical scanning device to print a scan confirmation sheet indicating that said scan job was received by said computerized device, said scan confirmation sheet comprising computer readable markings;

after printing said scan confirmation sheet, receiving, by said computerized device, a scan of said computer readable markings;

in response to said receiving said scan of said computer readable markings printed on said scan confirmation sheet, producing a status of said processing from said computerized device, said status including a step-by-step status of said workflow steps showing pending portions of said workflow steps of said scan job that have yet to be completed and completed portions of said workflow steps of said scan job that have been completed; and outputting said status in response to said receiving of said scan of said computer readable markings.

2. The method according to claim 1, said scan confirmation sheet further comprising checkboxes containing locations for user markings.

3. The method according to claim 2, said scan confirmation sheet further comprising printed user processing options adjacent said checkboxes, and user-supplied markings within said checkboxes causing said computerized device to perform said user processing options on said scan job.

4. The method according to claim 1, further comprising in response to said receiving said scan of said computer readable markings, altering said processing by said computerized device, said altering said processing comprising at least one of: canceling said processing; submitting a different scan job in place of said scan job; and changing processing operations to be performed on said scan job.

5. The method according to claim 1, said processing comprising automatically performing at least one of optical character recognition (OCR), image storage, record keeping management, data input, and transmission.

6. The method according to claim 1, said scan confirmation sheet further comprising at least one of: human readable markings; images of at least some pages in said scan job; and said status of said processing.

7. A method comprising:

receiving, by a computerized device, a first scan job from an optical scanning device, said scan job comprising workflow steps, said computerized device being operatively connected to said optical scanning device;

processing, by said computerized device, said workflow steps of said first scan job;

while portions of said workflow steps of said processing are pending, causing, by said computerized device, a printing device operatively connected to said optical scanning device to print a scan confirmation sheet indicating an error associated with said first scan job, said scan confirmation sheet comprising computer readable markings;

after printing said scan confirmation sheet, receiving, by said computerized device, a first scan of said computer readable markings;

in response to said receiving said first scan of said computer readable markings printed on said scan confirmation sheet, producing a status of said processing from said computerized device, said status including a step-by-step status of said workflow steps showing pending portions of said workflow steps of said scan job that have yet to be completed and completed portions of said workflow steps of said scan job that have been completed;

outputting said status in response to said receiving of said first scan of said computer readable markings;

receiving, by said computerized device, a second scan of a second scan job including said confirmation sheet;

in response to said receiving said second scan of said second scan job printed on said scan confirmation sheet, at least one of:

processing at least one additional scanned sheet accompanying said confirmation sheet within said second scan job to alter said processing of said first scan job while said portions of said processing are pending, using said computerized device; and altering said workflow steps of said first scan job by said computerized device while said portions of said workflow steps of said first scan job are pending.

8. The method according to claim 7, said scan confirmation sheet further comprising checkboxes containing locations for user markings.

9. The method according to claim 8, said scan confirmation sheet further comprising printed user processing options adjacent said checkboxes, and user-supplied markings within said checkboxes causing said computerized device to perform said user processing options on said first scan job and said second scan job.

10. The method according to claim 7, said altering said processing comprising at least one of: canceling said processing of said first scan job; substituting said second scan job in place of said first scan job; and changing processing operations to be performed on said first scan job.

11. The method according to claim 7, further comprising in response to said receiving said confirmation sheet, providing status of said processing of said first scan job by identifying pending portions of said processing and completed portions of said processing.

12. The method according to claim 11, said scan confirmation sheet further comprising at least one of: human readable markings; images of at least some pages in said scan job; and said status of said processing of said first scan job.

13. An apparatus comprising:

a processor device; and an input/output device operatively connected to said processor device, said processor device being operatively connected to an optical scanning device and a printing device, said input/output device receiving a scan job from said optical scanning device, said scan job comprising workflow steps, said processor device processing said workflow steps of said scan job, said processor device creating a scan confirmation sheet indicating that said scan job was received by said processor device, said scan confirmation sheet comprising computer readable markings, said input/output device transmitting said scan confirmation sheet to said printing device, said processor device causing said printing device to print said scan confirmation sheet while portions of said workflow steps of said processing are pending, said input/output device receiving a scan of said computer readable markings, in response to said input/output device receiving said scan said computer readable markings printed on said scan confirmation sheet, producing a status of said processing from said processor device, said status including a step-by-step status of said workflow steps showing pending portions of said workflow steps of said scan job that have yet to be completed and completed portions of said workflow steps of said scan job that have been completed, and said input/output device outputting said status in response to said receiving of said scan of said computer readable markings.

14. The apparatus according to claim 13, said scan confirmation sheet further comprising checkboxes containing locations for user markings.

15. The apparatus according to claim 14, said scan confirmation sheet further comprising printed user processing options adjacent said checkboxes, and user-supplied markings within said checkboxes causing said processor device to perform said user processing options on said scan job.

16. The apparatus according to claim 13, further comprising in response to said receiving said scan of said computer readable markings, altering said processing by said processor device, said altering said processing comprising at least one of: canceling said processing; submitting a different scan job in place of said scan job; and changing processing operations to be performed on said scan job.

17. The apparatus according to claim 13, said processing comprising automatically performing at least one of optical character recognition (OCR), image storage, record keeping management, data input, and transmission.

18. The apparatus according to claim 13, said scan confirmation sheet further comprising at least one of: human readable markings; images of at least some pages in said scan job; and said status of said processing.

19. An apparatus comprising:
a processor device; and
an input/output device operatively connected to said processor device,
said processor device being operatively connected to an optical scanning device and a printing device,
said input/output device receiving a first scan job from said optical scanning device,
said scan job comprising workflow steps,
said processor device processing said workflow steps of said first scan job,
said processor device creating a scan confirmation sheet indicating that said first job was received by said processor device,
said scan confirmation sheet comprising computer readable markings,
said input/output device transmitting said scan confirmation sheet to said printing device,
said processor device causing said printing device to print said scan confirmation sheet while portions of said workflow steps of said processing are pending,
after printing said scan confirmation sheet, said input/output device receiving a first scan of said computer readable markings,
in response to said receiving said first scan of said computer readable markings printed on said scan confirmation sheet, said processor producing a status of said processing,
said status including a step-by-step status of said workflow steps showing pending portions of said workflow steps of said scan job that have yet to be completed and completed portions of said-workflow steps of said scan job that have been completed,
said input/output device outputting said status in response to said receiving of said first scan of said computer readable markings,
said input/output device receiving a second scan of a second scan job including said confirmation sheet, and
in response to said input/output device receiving said second scan of said second scan job, at least one of:
said processor processing at least one additional scanned sheet accompanying said confirmation sheet within said second scan job to alter said workflow steps of said first scan job while said portions of said workflow steps of said scan job that are pending; and
said processor altering said workflow steps of said first scan job while said portions of said workflow steps of said first scan job are pending.

20. The apparatus according to claim 19, said scan confirmation sheet further comprising checkboxes containing locations for user markings.

21. The apparatus according to claim 20, said scan confirmation sheet further comprising printed user processing options adjacent said checkboxes, and user-supplied markings within said checkboxes causing said processor device to perform said user processing options on said first scan job and said second scan job.

22. The apparatus according to claim 19, said altering said processing comprising at least one of: canceling said processing of said first scan job; substituting said second scan job in place of said first scan job; and changing processing operations to be performed on said first scan job.

23. The apparatus according to claim 19, further comprising in response to said receiving said confirmation sheet, said processor providing status of said processing of said first scan job by identifying pending portions of said processing and completed portions of said processing.

24. The apparatus according to claim 23, said scan confirmation sheet further comprising at least one of: human readable markings; images of at least some pages in said scan job; and said status of said processing of said first scan job.

* * * * *